United States Patent

[11] 3,601,142

| [72] | Inventor | Virgil L. Frantz<br>Salem, Va. |
|---|---|---|
| [21] | Appl. No. | 39,074 |
| [22] | Filed | May 20, 1970<br>Division of Ser. No. 767,631, Oct. 15, 1968 |
| [45] | Patented | Aug. 24, 1971 |
| [73] | Assignee | Graham-White Sales<br>Salem, Va. |

[54] GAUGE-TESTING FITTING
4 Claims, 9 Drawing Figs.

[52] U.S. Cl. ................................................. 137/269
[51] Int. Cl. .................................................. G01l 17/00
[50] Field of Search .......................................... 137/269,
227, 231, 317, 318, 322, 798, 799, 557

[56] References Cited
UNITED STATES PATENTS

| 1,208,162 | 12/1916 | Jungjohann .................. | 137/227 |
| 1,230,981 | 6/1917 | Bacon ......................... | 137/227 X |
| 1,484,342 | 2/1924 | Schweinert ................... | 137/231 |
| 3,311,125 | 3/1967 | Beasley ....................... | 137/557 X |
| 3,424,197 | 1/1969 | Toru Yanagisawa ......... | 137/557 |

Primary Examiner—M. Cary Nelson
Assistant Examiner—Robert J. Miller
Attorney—Wilmer Mechlin ABSTRACT: A fitting for mounting a pressure gauge or other pressure-sensing member for use in a testing system with a testing gun or other testing device. The fitting is ported for connection to a pressure line and is so valved and so locks the sensing member in place as automatically to disconnect the sensing member from the pressure line on and prevent unlocking of the sensing member except on removal of a plug normally closing the fitting's testing port.

Inventor:
Virgil L. Frantz
his Attorney

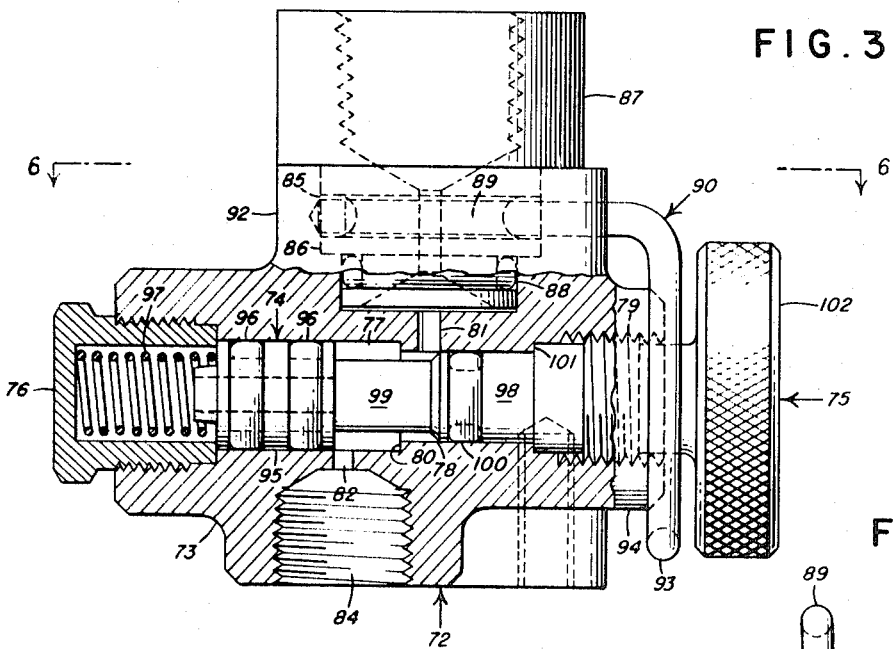
FIG.3
FIG.4
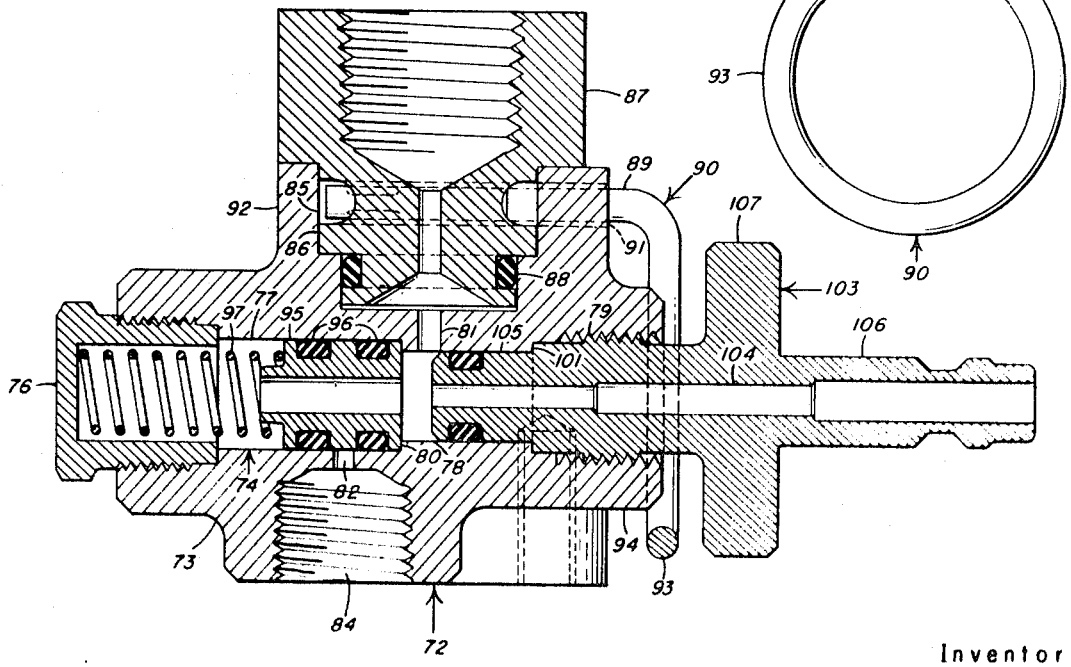
FIG.5
Inventor:
Virgil L. Frantz
Wilmer Mechlin
his Attorney Inventor:
Virgil L. Frantz
Wilmer Mechlin
his Attorney 3,601,142

GAUGE-TESTING FITTING

RELATED APPLICATION

This is a division of application Ser. No. 767,631, filed Oct. 15, 1968.

BACKGROUND OF THE INVENTION

Diesel locomotives in particular are equipped with numerous air pressure gauges which must be tested periodically for accuracy. Conventionally, such gauges are tested by testing systems using oil as the testing fluid, applying pressure to the oil by a handwheel-operated screw piston, which, with its cylinder is of such weight as to require mounting during testing, and transmitting the applied pressure to the gauge through a fitting which is ported to receive a testing probe but does not automatically cut off the pressure line to which the gauge is normally connected during application and removal of the probe. An improved system for testing such gauges is the invention of parent application Ser. No. 767,631, while the present invention is directed to an improved fitting for use in a testing system for mounting a gauge.

SUMMARY OF THE INVENTION

An object of the invention is to provide for use in a gauge-testing system an improved gauge-testing fitting to which a gauge is releasably lockable and which is permanently connectable to a pressure line and automatically shuts off that line and prevents unlocking of the gauge except on removal of a plug normally closing the fitting's testing port.

Another object of the invention is to provide an improved gauge-testing fitting of the foregoing character which is usable in either the improved testing system of the above parent application or a conventional testing system.

Other objects and features of the invention will appear hereinafter in the detailed description, be particularly pointed out in the appended claims and be illustrated in the accompanying drawings, in which:

FIG. 3 is a view on an enlarged scale of the preferred gauge fitting of the improved system, partly in side elevation and partly in a vertical section taken along the lines 3—3 of FIG. 6, showing the normal condition of the fitting;

FIG. 4 is a plan view of the locking key of the fitting of FIG. 3;

FIG. 5 is a view of the fitting of FIG. 3 in the vertical section of part of that figure, showing the fitting in testing condition;

DETAILED DESCRIPTION

Figure 1:
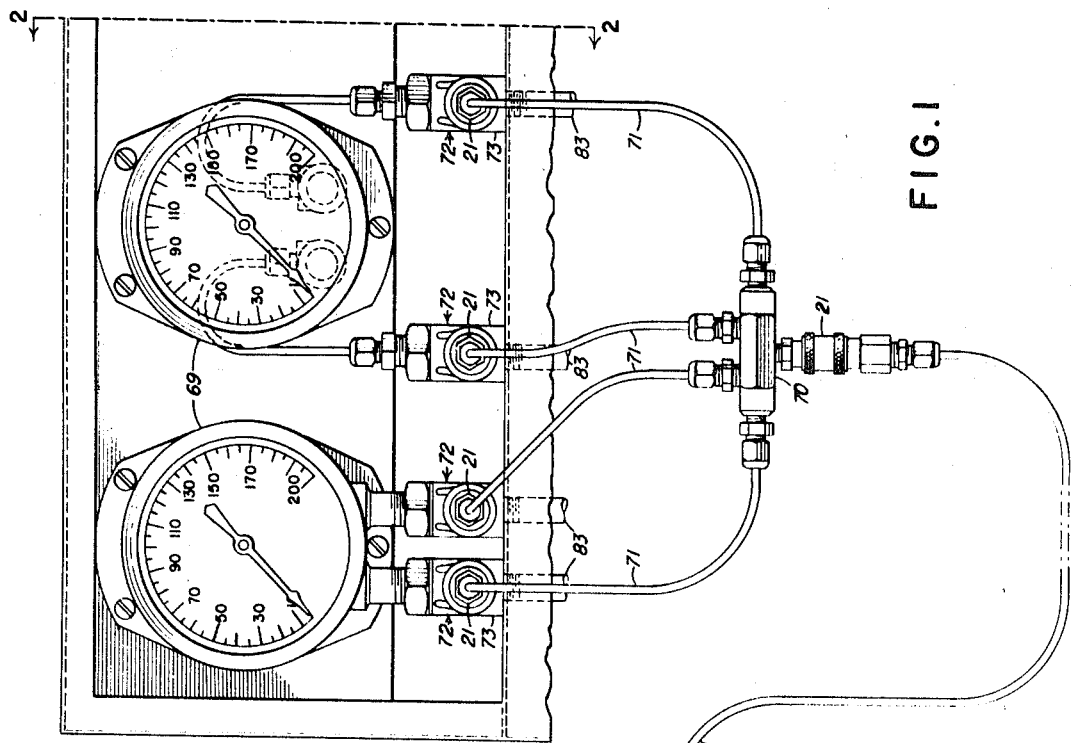
FIG. 1 is an elevational view showing a side of the testing gun and fronts of the gauges in a typical test hookup of a testing system incorporating the improved testing fittings of the present invention.
Figure 2:
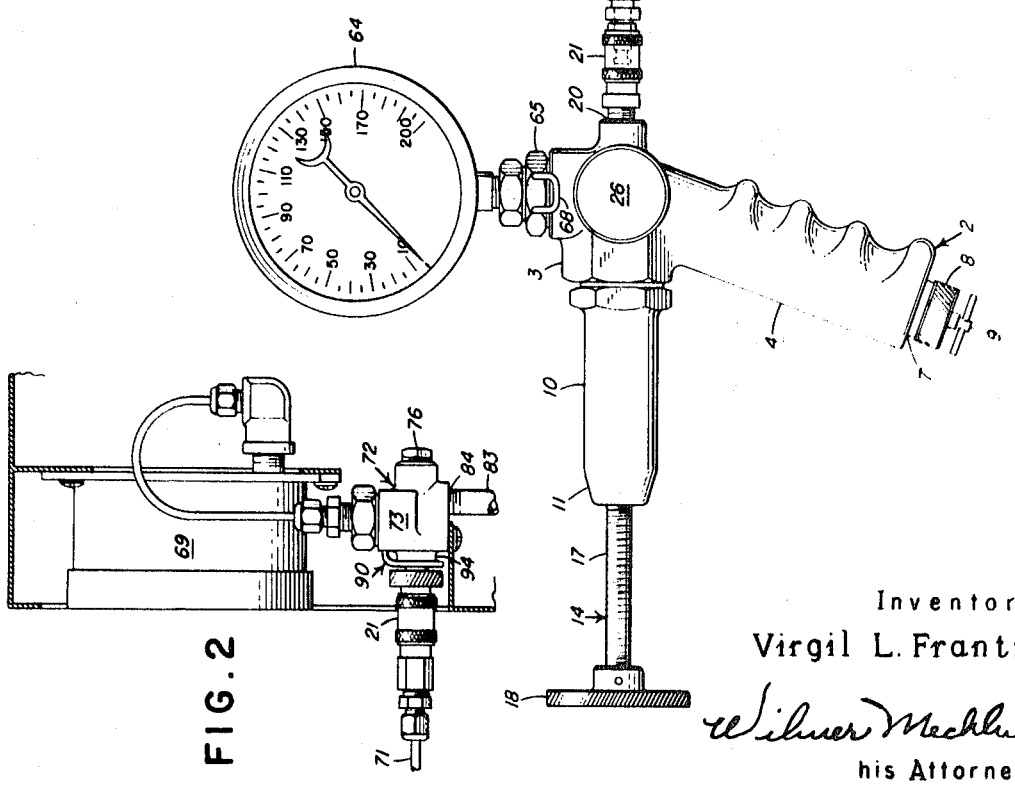
FIG. 2 is a fragmentary vertical sectional view taken along lines 2—2 of FIG. 1.
Figure 6:
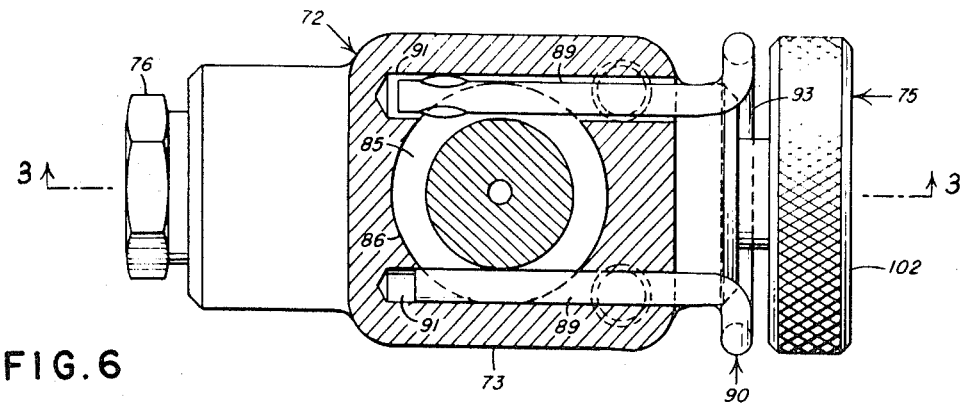
FIG. 6 is a horizontal sectional view taken along lines 6—6 of FIG. 3.

Referring now in detail to the drawings in which like reference characters designate like parts, the improved testing fitting of the present invention is adapted for use in testing fluid pressure sensing members, such as pressure gauges and switches, of which the air pressure gauges found on diesel locomotives have been illustrated as exemplary of the invention.

While adapted for use in a conventional gauge-testing system, the improved fitting is particularly designated for use in the improved testing system of application, Ser. No. 767,631, the preferred embodiment of which is illustrated in FIG. 1 and designated as 1. Insofar as the present invention is concerned, the essential of the testing system in which it is used is that the system include means for applying testing fluid at known pressures over the pressure range of the pressure-sensing member to be tested. In the illustrated system the pressure applying means is the hand-holdable testing gun or tester 2, the construction of which is shown and described in detail in the parent application. Reference therefore will be made to that application for details of the testing gun 1 beyond those appearing in FIG. 1.

As illustrated, the testing gun 2 has a body 3 having as an integral part a pistol grip handle 4. Testing fluid is derived from a pressurized gas cartridge (not shown) in the handle 4 through a bottom opening 7 normally closed by a cap 8 mounting a piercing pin 9. Screwed into the body 3 is a barrel 10 having a rear wall 11 and containing forwardly of that wall a head (not shown) of a piston 14 having a threaded stem 17 and turned by a knob 18. An outlet port 20 in the front of the body 3 is connectable through a quick-disconnect coupling 21 to a flexible outlet pipe 22. The pressurized gas from the cartridge, after being reduced in pressure by a valve assembly including a control valve 26, is introduced into the barrel 10 and adjusted by the piston 14 to particular pressures within the range of the sensing device to be tested. So that the testing pressure produced at any time in the barrel 10 and applied through the outlet 20 will be known, the gun 2 has a master gauge 64 mounted on the body 3 by a fitting 65 and locked against accidental removal by locking key 68.

In testing a single pressure gauge or pressure-sensing member, the testing gun 2 can be connected by the flexible pipe 22 directly to that gauge. However, the gun is as readily adaptable for testing at one time a plurality of gauges of the same pressure range and, as exemplary of such applications, it is shown in FIG. 1 in a hookup for simultaneously testing both sides or legs of a pair of duplex pressure gauges 69. In this hookup the end of the outlet pipe 22 removed from the gun 2 is connected by a quick-disconnect coupling 21 to a manifold 70 having on its outlet side four flexible leads each connected by a quick-disconnect coupling on its outer end to one of the pair of fittings 72 on which each of the duplex gauges 69 is mounted. While all of the leads 71 are connected in the exemplary hookup, since the preferred quick-disconnect couplings 21 automatically cut off when disconnected, one or more can be disconnected without interfering with testing through the remainder if testing or less than all is desired.

Whether the hookup is to include one or a plurality of gauges, the testing is greatly facilitated if each gauge is mounted in the improved fitting 72 of the present invention. The improved fitting has a body 73 through which extends from front to back an aperture or opening 74 threaded over its opposite end portions for normally threadedly receiving at the front a plug 75 and for closing at the back by a preferably hollow and inwardly opening threaded cap 76. Between its end portions, the aperture 74 is smooth walled and divided axially into a cylindrical valve chamber or rearward portion 77 and a concentric cylindrical intermediate bore, passage or forward portion 78 opening onto the front of the body through a testing or plug port 79 formed by the aperture's threaded front end portion, the bore conveniently being of less diameter than the valve chamber to provide at the front end thereof an instanding annular shoulder or stop 80.

In the fitting 72 and opening onto or communicating with the aperture 74 at axially spaced points or positions are a pair of relatively staggered, preferably radial ports or ducts, one an outlet port 81 and the other an inlet port 82 opening respectively onto the intermediate bore 78 and valve chamber 77 preferably adjacent the inner or confronting ends thereof. When the fitting 72 is mounted between and physically connects the gauge or other pressure-responsive member 69 and the related pressure line 83, the outlet port 81 leads or is connected to the former and inlet port 82 to the latter and if, as in the illustrated embodiment, the fitting is connectable at the top to the gauge and at the bottom to the line, the ports conveniently are diametrically opposed and vertically disposed. The physical connection between the fitting and the pressure line 83 may be made in any suitable manner, as by providing a threaded socket 84 in the bottom of the body 73. However, for quick disconnection of the gauge if testing indicates replacement to be needed, as well as to enable the gauge to be swiveled to face in any desired direction, there is provided in the top of the body an upwardly opening, preferably inwardly instepped cylindrical socket 85 which is swivelly seated or received in a correspondingly configured neck or lower part of a swivel nut or coupling base 87. Socketed or otherwise formed above the body 73 for threaded or other relatively permanent connection to the gauge 69, the swivel nut 87 is suitably sealed against leakage to the body 73, as by grooving the lower part of the neck 86 thereof to receive or carry an O-ring 88.

For locking the nut in place while permitting it to swivel relative to the body, the upper part of the neck also is peripherally grooved, in its case for receiving the straddling or embracing, laterally spaced instanding legs 89 of a generally U-shaped locking key 90 insertable from the front into suitable holes or openings 91 and an upstanding boss 92 on the body 73 about the socket 85. Outwardly of the body 73, the locking key 90 has a downstanding loop or looped handle 93 connecting the legs and surrounding or embracing a forwardly projecting or front boss 94 on the body about the testing port 79. To ensure that the loop 93 will always occupy this downstanding position when the locking key 90 is in place, one of the legs 89 and its hole 91 are relatively enlarged or otherwise differently formed from the others so that that leg will only fit into the one hole.

The outlet port 81 to the gauge 69 is intended normally to be connected to the inlet port 82 through the aperture 74 but to be disconnected therefrom during testing. This function preferably is performed by a double-headed, preferably axially bored or hollow shuttle 95 slidable or reciprocable in the valve chamber 77 between the inner end of the cap 76 and the instanding shoulder 80 and conveniently having as its heads a pair of axially spaced O-rings 96, which in the outer position of the shuttle against the cap are positioned outwardly of and in its inner position against the shoulder straddle or embrace the opening of the inlet port onto the valve chamber. A spring 97 in the cap and acting therebetween and the outer or confronting end of the shuttle 95, is adapted yieldably to hold the shuttle in its inner, outlet port-closing position against the shoulder 80, in the absence of an overriding, port-closing force on the shuttle's inner end.

To make use of the shuttle 95 and its spring 97 for automatically opening and closing the inlet port 82, respectively, as the plug 75 is unthreaded or removed from and threaded or inserted into the testing port 79, the plug 75 has a stem 98 of such length as, when fully seated, to protect through the intermediate bore 78 and into the valve chamber 77 sufficiently to engage or bear against the inner end of and force the shuttle to its outer or inlet port-opening position. The tip or inner end portion 99 of the stem 98, at that time spanning or straddling the inner ends of the ports 81 and 82, is of less diameter or cross section than both the bore 78 and chamber 77 so that the ports can communicate therepast or therearound. Outwardly of the tip 99 and the outlet port 81, the stem preferably is enlarged for a sliding fit with the bore 78 and, for sealing against leakage past the plug 75, conveniently peripherally seats an O-ring or like sealing gasket 100 rubbing against the side of the bore. Rather than depend on the shuttle for limiting inward movement of the plug, the stem 98 outwardly beyond the bore 78 is further enlarged for engagement with an outwardly facing annular shoulder 101 in the aperture 74 at and radially outstanding from the bore's outer end. For applying and removing it, the plug 75 has on its outer end beyond both the body 73 and the loop 93 of the locking key 90, a handle 102, which conveniently may be a knurled knob of sufficient relative diameter not to be able to pass through the loop and should in any case radially or laterally overlap at least part of the loop and have such proximity to the front boss 94 as to be engageable with and prevent removal of the key and unlocking of the swivel nut 87 when the plug is in place.

Normally closing the testing port 79, the plug 75 is removed when the gauge or other pressure-sensing member attached to the fitting 72 is to be tested, and replaced for such testing by a testing bayonet or probe 103, which, save for an axial bore 104 through its stem 105, an outward extension 106 of the stem beyond its handle 107 configured to take or receive a quick-disconnect coupling 21 on the outer end of one of the leads 71 and the lack of a tip projecting inwardly beyond the outlet port 81, preferably is identical in construction with the plug. As the testing bayonet 103, when fully seated, terminates short of the outlet port 81, its application and removal will not disturb the shuttle 95 from its position closing the inlet port 82. Conversely, the inwardly longer plug 75 will disturb the position of the shuttle and with the spring 97 will automatically move the shuttle between positions to close and open the inlet port 82 respectively as the plug is removed and applied. In process the preferred shuttle, with fluid pressure balanced on its ends due to its axial boring, will be free of any restraint from such pressure.

Figure 7:
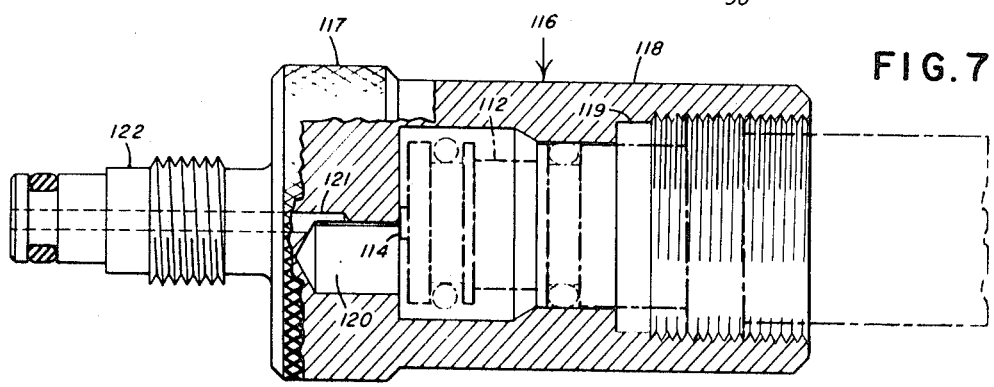
FIG. 7 is a side elevational view partly in central section of an adapter enabling a gauge equipped with the preferred fitting to be tested with the conventional system.
Figure 8:
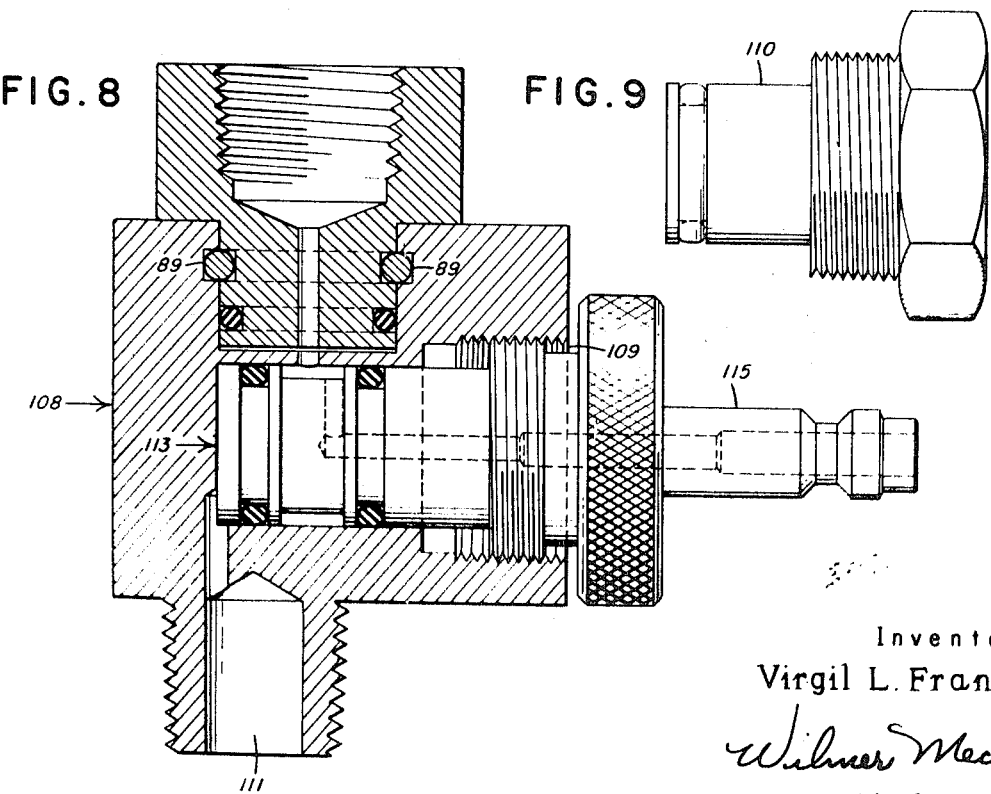
FIG. 8 is a central vertical sectional view of a conventional gauge fitting showing applied thereto an adapter for enabling a gauge mounted thereon to be tested with the improved system.
Figure 9:
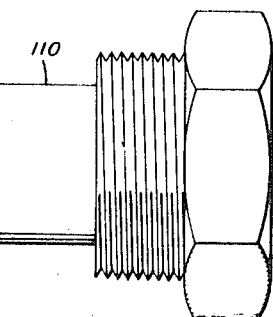
FIG. 9 is a side elevational view of the plug normally closing the testing port of the conventional fitting of FIG. 8.

While particularly designed to receive the testing probe 103 of the improved system of the parent application, the improved fitting also can be adapted to receive the probe of a conventional testing system. In the conventional fitting 108 shown in FIG. 8 there is no valve and the testing port 109 normally is closed by the plug 110 shown in FIG. 9. When a testing operation is to be conducted with the conventional fitting, the plug 110 is removed after first bleeding pressure from the line leading to the inlet port 111, whereafter the testing port 109 is closed by a testing probe 112, which, as indicated in FIG. 7, is similar to the adapter probe 113 of FIG. 8 for adapting a conventional fitting for use in the illustrated system 1, but differs therefrom in having a check valve 114 normally blocking outflow therefrom and being devoid of the outward stem extension 115 of the adapter probe for taking a quick-disconnect coupling 21 on a lead 71 of the illustrated system, instead being permanently connected to the lead. The converse adapter 116 of FIG. 7 for adapting a conventional probe to the improved fitting, is identical back to its handle 117 with the testing bayonet 103 of the illustrated system, but differs therefrom in having fixed to and extending outwardly from the handle a casing 118 having an outwardly opening socket 119 into which the conventional tester probe 112 is threaded and an offset passage 120 connecting the socket to the axial bore 121 through the stem 122, permitting fluid to flow from the conventional probe to the gauge being tested when the stem is inserted in the improved fitting 72 sufficiently to trip the check valve 114 against the inner end of the socket.

In testing a gauge or other pressure-sensing member mounted on the fitting 72, the plug 75 is first removed, in process automatically shutting off the inlet port 82 from the testing port 79. The testing probe 103 is then inserted in the testing port and thereafter connected by a quick-disconnect coupling 21 to one of the leads 71. At this juncture testing pressure is applied by the testing gun 2 or other suitable pressure-applying means over any desired portion of the range of the gauge and, if the gauge is found accurate, the probe is removed and the plug reinserted. Otherwise, without replacing the plug, the locking key 90 is removed, thereby releasing the defective gauge from the fitting. If the defective gauge is of the illustrated duplex type, it is similarly released from the companion fitting and in either case is removed, usually for immediate replacement by a like but accurate gauge.

It should be understood that the described and disclosed embodiment is merely exemplary of the invention and that all modifications are intended to be included that do not depart from the spirit of the invention and the scope of the appended claims.

Having now described my invention, I claim:

1. In a system for testing pressure-sensing members, a fitting having therein an aperture and a testing port in an end of said aperture, inlet and outlet ports opening at axially spaced positions onto said aperture and connectable respectively to a pressure line and a pressure-sensing member, plug means normally closing said testing port, a shuttle in said aperture and shiftable automatically therein in response to application and removal of said plug means respectively for opening and closing said inlet port, and testing means insertable in said testing port on removal of said plug means for passing testing pressure therethrough and said outlet port to said sensing member.

2. A fitting according to claim 1, including key means insertable into the fitting for swivelly locking said sensing member thereto, and means on said key and plug means and engageable on attempted removal of said plug means for preventing removal of said key means except on removal of said plug means.

3. A fitting according to claim 2, including means for preventing insertion of said key means in said fitting except in a position wherein said engageable means will engage on attempted removal of said key means in the presence of said plug means.

4. A fitting according to claim 1, wherein the testing means is an adapter for receiving a probe of a conventional testing system.